United States Patent
Choi et al.

(10) Patent No.: US 9,082,446 B2
(45) Date of Patent: Jul. 14, 2015

(54) OPTICAL DISC LOADING DEVICE, OPTICAL DISC DRIVE ADOPTING THE DEVICE AND METHOD OF DRIVING THE DRIVE

(71) Applicant: TOSHIBA SAMSUNG STORAGE TECHNOLOGY KOREA CORPORATION, Suwon-Si (KR)

(72) Inventors: Un-Jin Choi, Suwon-si (KR); Joung-sug Ko, Seoul (KR); Sang-yun Baek, Seongnam-si (KR); Cheol-woong Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/683,018

(22) Filed: Nov. 21, 2012

(65) Prior Publication Data

US 2013/0212604 A1    Aug. 15, 2013

(30) Foreign Application Priority Data

Nov. 23, 2011    (KR) .......................... 10-2011-0123123

(51) Int. Cl.
*G11B 17/04*    (2006.01)
*G11B 17/028*   (2006.01)
*G11B 17/051*   (2006.01)

(52) U.S. Cl.
CPC ........ *G11B 17/0402* (2013.01); *G11B 17/0288* (2013.01); *G11B 17/0404* (2013.01); *G11B 17/051* (2013.10)

(58) Field of Classification Search
CPC .. G11B 17/028; G11B 17/0288; G11B 17/04; G11B 17/0401; G11B 17/0402; G11B 17/0404; G11B 17/0405; G11B 17/0407; G11B 17/0408; G11B 17/05; G11B 17/051; G11B 17/0515
USPC ................. 720/600, 601, 602, 606, 609, 610, 720/619–626, 636–638, 645–647, 652, 661
See application file for complete search history.

(56) References Cited

U.S. PATENT DOCUMENTS

| | | | |
|---|---|---|---|
| 6,411,582 B1 * | 6/2002 | Nakatani et al. ............... | 720/620 |
| 2002/0150020 A1 * | 10/2002 | Mizoguchi et al. .......... | 369/77.1 |
| 2006/0117330 A1 * | 6/2006 | Choi ............................ | 720/619 |
| 2007/0067783 A1 * | 3/2007 | Ogasawara et al. ........... | 720/612 |
| 2007/0192781 A1 * | 8/2007 | Ahn et al. ..................... | 720/714 |
| 2010/0287574 A1 | 11/2010 | Kumagami | |
| 2011/0029993 A1 * | 2/2011 | Fujisawa ....................... | 720/620 |

FOREIGN PATENT DOCUMENTS

| | | |
|---|---|---|
| JP | 2005-004914 A | 1/2005 |
| KR | 10-2000-0061277 A | 10/2000 |

OTHER PUBLICATIONS

Korean Office Action issued Jul. 24, 2013 in counterpart Korean Patent Application No. 10-2011-0123123. (4 pages in Korean).

* cited by examiner

*Primary Examiner* — Nathan Danielsen (74) *Attorney, Agent, or Firm* — NSIP Law (57) ABSTRACT

Provided are an optical disc drive and method for driving the optical disc drive. The method includes transporting a disc to a chucking position where a spindle is positioned using a loading roller, blocking power transferred from a loading motor to the loading roller, and chucking the disc on the spindle using power from the loading motor. Accordingly, damages to the disc caused by chucking may be prevented.

12 Claims, 5 Drawing Sheets

OPTICAL DISC LOADING DEVICE, OPTICAL DISC DRIVE ADOPTING THE DEVICE AND METHOD OF DRIVING THE DRIVE

CROSS-REFERENCE TO RELATED APPLICATION(S)

This application claims the benefit under 35 USC §119(a) of Korean Patent Application No. 10-2011-0123123, filed on Nov. 23, 2011, in the Korean Intellectual Property Office, the entire disclosure of which is incorporated herein by reference for all purposes.

BACKGROUND

1. Field

The following description relates to an optical disc drive and a method of driving the same, and for example, to a roller type, slot-in optical disc drive and a method of driving the same.

2. Description of Related Art

Optical disc drives are classified into types such as a tray type and a slot-in type, according to a disc loading structure. The slot-in type is further classified into a lever type and a roller type according to a disc holding structure.

In a roller type disc loading structure, the chucking of a disc is performed with respect to a spindle after loading the disc into an optical disc drive. Typically the loading and the chucking are performed using a single loading motor. In this type structure, there is a problem in that after a disc has been transported to a loading position, chucking of the disc with respect to a spindle is performed while a loading roller is idle.

When transportation of the disc is completed, further transportation of the disc is prevented by a stopper which maintains a chucking position. When the loading roller rotates in this state, the loading roller and the disc may rub against each other and generate scratches on a surface of the disc. The damage to the disc is caused by the transportation and chucking of the disc via the loading motor. Therefore, a technique which prevents such damage is needed.

SUMMARY

In an aspect, there is provided a method of driving an optical disc drive including a loading roller, a loading motor providing power to the loading roller, and a power train system transferring power between the loading motor and the loading roller, the method including transporting a disc to a chucking position where a spindle is located, via the loading roller, blocking power from the loading motor to the loading roller in response to transportation of the disc being completed, and chucking the disc on the spindle using the power transmitted from the loading motor.

The power train system may comprise a plurality of gears, and during the blocking of the power, one of two gears, which are engaged with each other, from among the plurality of gears of the power train system, may be separated from the other gear.

The optical disc drive may further comprise a main slider that is operatively connected to the power train system and which lifts up and down the optical pickup assembly, and the chucking of the disc may comprise causing the spindle of the optical pickup assembly to approach the disc via the main slider.

The optical disc drive may further comprise a clutch lever that operates via the main slider and a clutch gear that is interposed between the gears of the power train system and controls power transfer between the gears, and the chucking of the disc may comprise operating the clutch gear via the clutch lever so as to separate the clutch gear from a gear that is engaged with the clutch gear.

In an aspect, there is provided an optical disc loading device including a loading motor, a loading roller that is driven by the loading motor and which loads and unloads a disc, a power train system that is disposed between the loading motor and the loading roller and which comprises a plurality of gears, and a power switching system that is disposed in the power train system and which controls a power transfer path between the gears.

The power switching system may comprise a clutch gear that is interposed between the gears of the power train system, and a clutch lever that is synchronized with the loading of the disc to operate the clutch gear to block the power transfer path between the gears.

The optical disc loading device may further comprise a main slider that operates the clutch lever, wherein the main slider operates via the loading motor.

In an aspect, there is provided an optical disc drive including an optical pickup assembly comprising a spindle on which a disc is mounted, and an optical pickup module, a loading motor providing power to load the disc, a loading roller transporting the disc in a direction of the spindle, a power train system that is disposed between the loading motor and the loading roller and which includes a plurality of gears, and a power switching system that is included in the power train system and which controls a power transfer path between the gears.

The power switching system may comprise a clutch gear that is interposed between the gears of the power train system and which controls a power transfer path between the gears, and a clutch lever that is synchronized with loading of the disc to operate the clutch gear and which controls the power transfer path.

The power train system may further comprise a main slider that moves reciprocally via one of the gears and operates the clutch lever.

A third guide pin may be formed in the clutch lever, and a third cam groove portion into which the third guide pin is inserted may be formed in the main slider.

A first cam groove that lifts up or down the optical pickup assembly may be formed in the main slider, and a first guide pin that is inserted into the first cam groove may be formed on the optical pickup assembly.

The optical disc drive may further comprise an eject lever that ejects the disc and operates via the main slider.

A second guide pin may be formed on the eject lever, and a second cam groove into which the second guide pin is inserted may be formed in the main slider.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
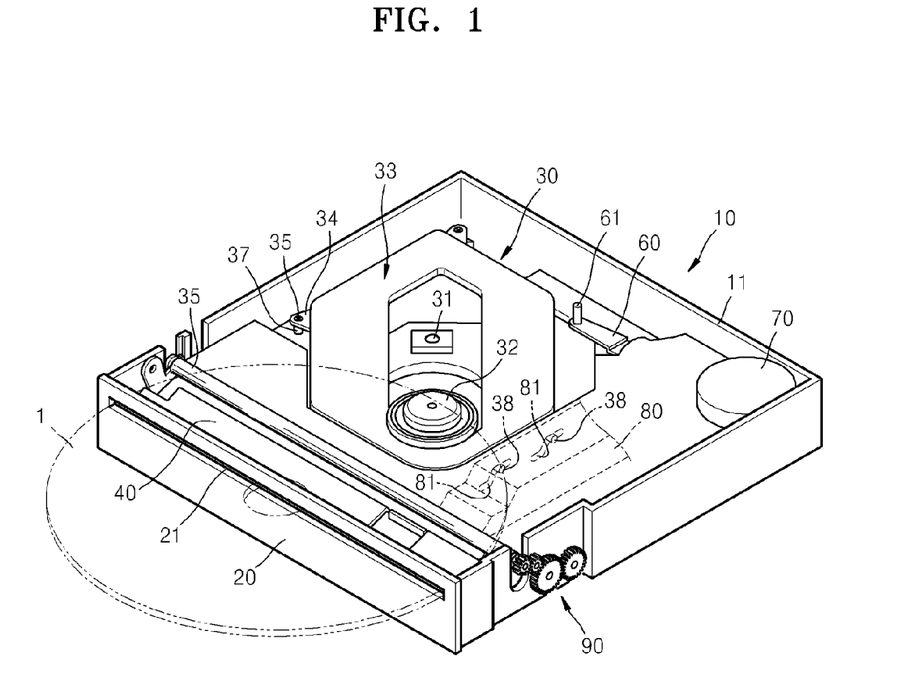
FIG. 1 is a diagram illustrating an example of an internal structure of a slot-in type optical disc drive.

FIG. 1 illustrates an example of an internal structure of a slot-in optical disc drive.

Referring to FIG. 1, a front panel 20 includes a slot for inserting or ejecting a disc 1 and is disposed in front of a main frame 11. A rotating door 40 that opens and closes the slot 21 and a loading roller 50 (see FIG. 2) are formed at the back of the front panel 20. In addition, an eject lever 60 that has a disc pusher 61 is disposed in an inner back portion of the main frame 11.

An optical pickup assembly 30 is disposed in a cavity formed in a central portion of the main frame 11. The optical pickup assembly 30 includes a spindle 32, an optical pickup module 31, and a sub frame 33 supporting the spindle 32 and the optical pickup module 31. The optical pickup assembly 30 may be rotated via a main slider 80 such that the optical pickup module 31 and the spindle 32 approach the disc 1 or are separated from the disc 1. To this end, a plurality of fixed wings 34 which are fixed by screws 35 via spacers 37 are formed in the sub frame 33. A first guide pin 38 is inserted into a first cam groove 81 disposed at the side of the main slider 80 and is formed near the spindle 32 of the sub frame 33. The first guide pin 38 is lifted up and down according to reciprocal movement of the main slider 80 so as to lift up or down the spindle 32 and the optical pickup module 31.

Furthermore, a loading motor 70 is formed at a corner of the main frame 10 near the eject lever 60. The loading motor 70 may drive the optical pickup assembly 30, the rotating door 40, the loading roller 50, the eject lever 60, and the main slider 80 via the power train system 90 which includes a plurality of gears.

Figure 2:
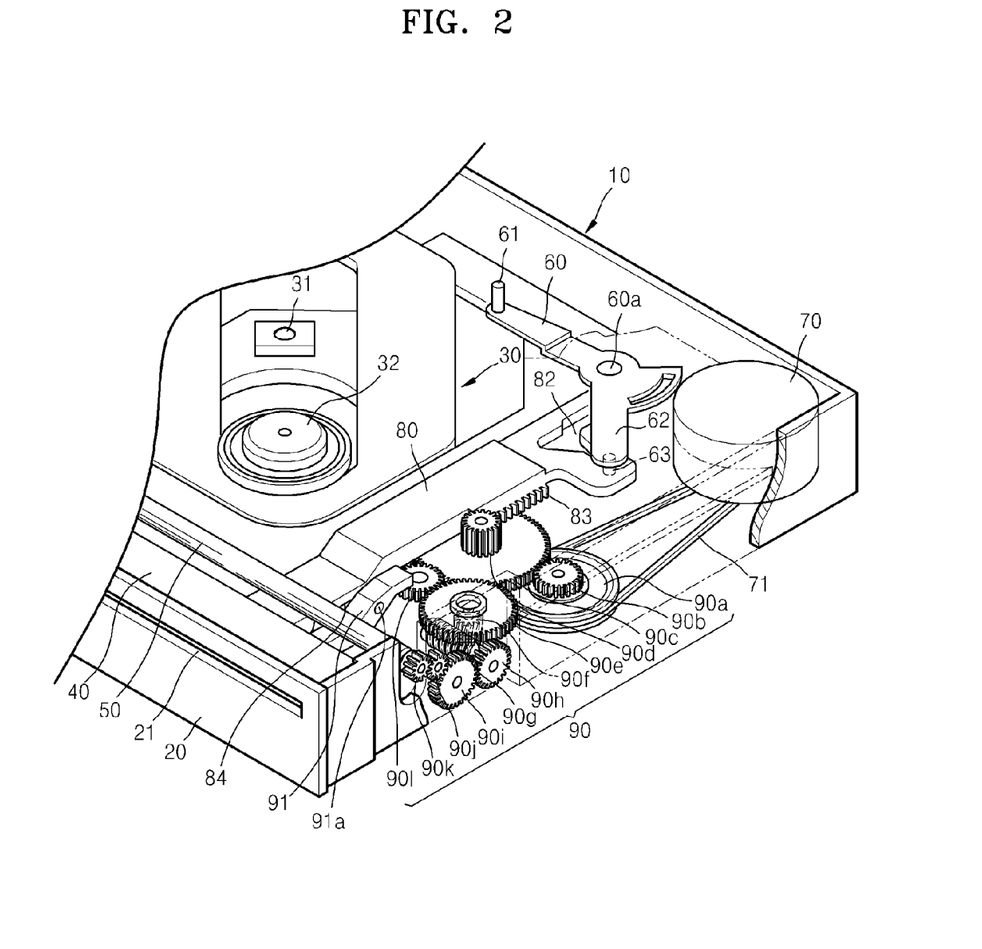
FIG. 2 is a diagram illustrating an example of a power train system mounted in the slot-in type optical disc drive of FIG. 1.
Figure 3:
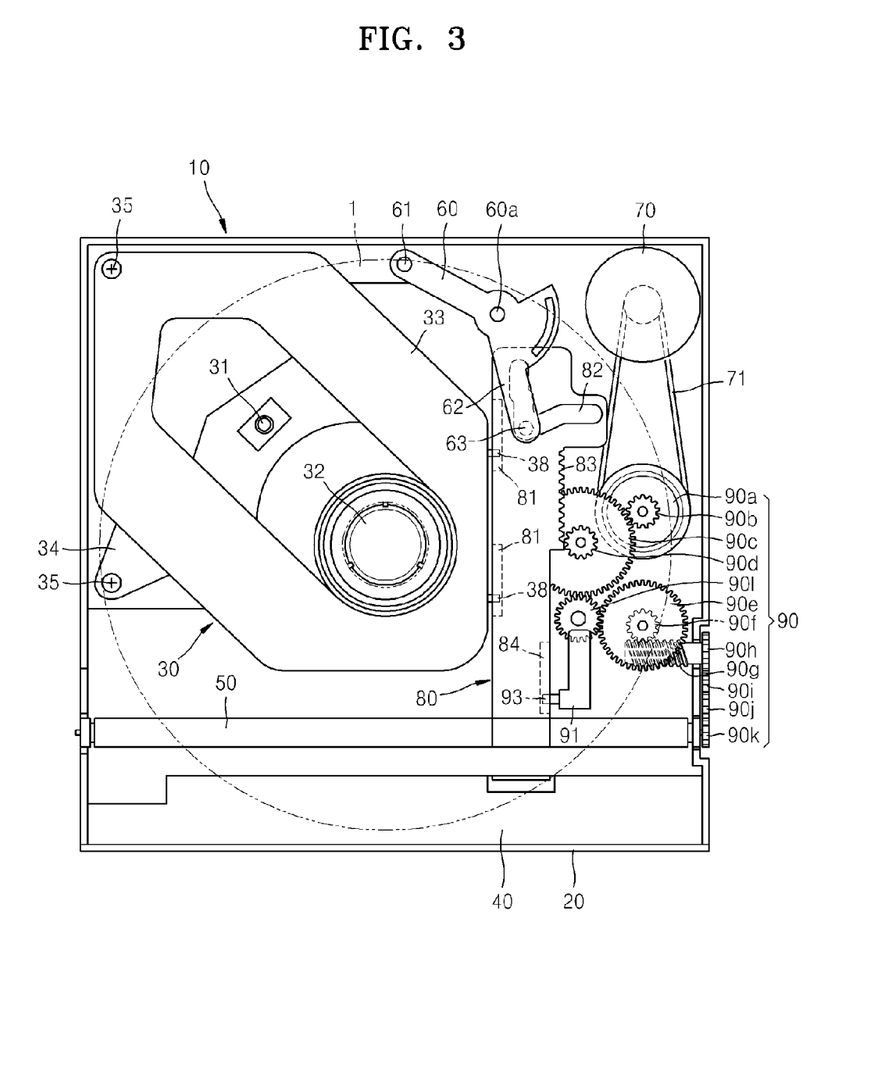
FIG. 3 is a diagram illustrating another example of the power train system mounted in the slot-in type optical disc drive illustrated in FIGS. 1 and 2.
Figure 4:
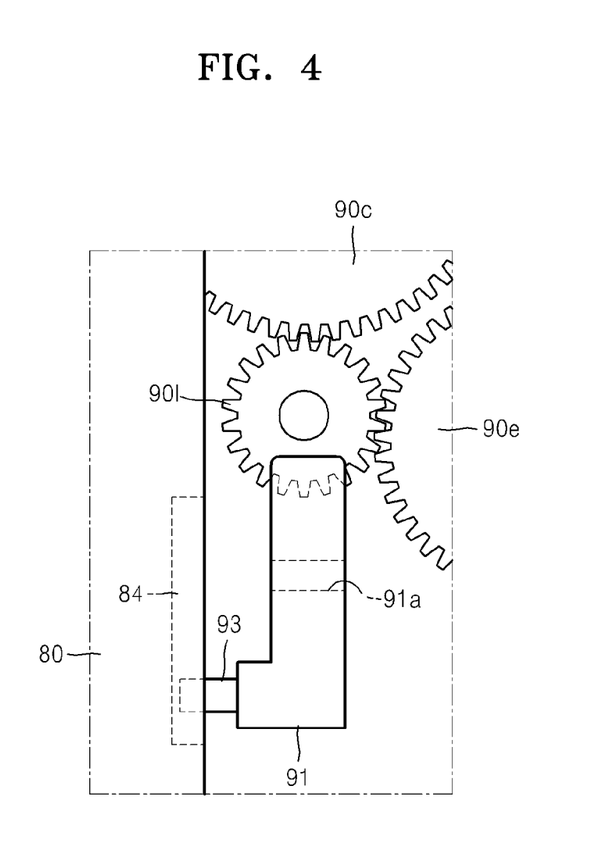
FIG. 4 is a diagram illustrating an example of a power switching system mounted in the slot-in type optical disc drive illustrated in FIGS. 1 and 2.

FIG. 2 illustrates an example of the power train system 90 that transfers power transmitted from the loading motor 70. FIG. 3 illustrates another example of the power train system 90. FIG. 4 illustrates an example of a power switching system mounted using a clutch gear 90*l*.

Referring to FIGS. 2 and 3, the loading motor 70 is connected to a pulley 90*a* via a belt 71. Accordingly, the pulley 90*a* is rotated directly by the loading motor 70. In this example, a first gear 90*b* is integrally coaxially formed with the pulley 90*a*. The first gear 90*b* is in a tooth engagement with a second gear 90*c* that is integrally coaxially formed with a third gear 90*d* which is in a tooth engagement with a spur gear 83 formed on the main slider 80. Accordingly, the main slider 80 may reciprocally move a predetermined distance by rotation of the loading motor 70.

A fourth gear 90*e* is disposed adjacent to the second gear 90*c*. A clutch gear 90*l* is disposed between the second and fourth gears 90*c* and 90*e*. The clutch gear 90*l* is operating between the second and fourth gears 90*c* and 90*e* via a clutch lever 91, and controls power between the second gear 90*c* and the fourth gear 90*e*. The clutch gear 90*l* may be elastically installed to be lifted down in an axial direction, and thus, may be engaged with the second gear 90*c* and the fourth gear 90*e* in a normal state. Also, when the clutch lever 91 in operation presses the clutch gear 90*l*, the clutch gear 90*l* is separated from the fourth gear 90*e*.

In this example, the clutch lever 91 rotates with respect to a rotation axis 91*a*. A pressing portion 94 (shown in FIG. 5) contacting the clutch gear 90*l* is disposed at a front end of the clutch lever 91, and a third guide pin 93 is formed in a rear end portion of the clutch lever 91. The third guide pin 93 is positioned at a third cam groove 84 formed at a side of the main slider 80. A worm wheel 90*f* is formed below the fourth gear 90*e* that receives power from the clutch gear 90*l*. Also, a worm shaft 90*f* that is engaged with the worm wheel 90*g* is formed beside the worm wheel 90*f*. The worm wheel 90*f* and the worm shaft 90*g* change a movement direction or a rotation direction. In this example, a rotation axis of the worm wheel 90*f* is a vertical direction, and a rotation axis of the worm shaft 90*g* is a horizontal direction.

A fifth gear 90*h* is coaxially coupled to the worm shaft 90*g*, and power from the fifth gear 90*h* is transmitted to a loading gear 90*k* via sixth and seventh gears 90*i* and 90*j*. Further, the loading gear 90*k* is coaxially coupled to the loading roller 50, and may be used to load or unload the disc 1 via the loading roller 50.

A second cam groove portion 82 is formed in the main slider 80. The second cam groove portion 82 may be used to operate the eject lever 60 that is rotatably installed with respect to a rotation axis 60*a*. A second guide pin 63 is formed on an operating lever 62 that is integrally formed with the eject lever 60. The second guide pin 63 is disposed in the second groove portion 82. Thus, when the main slider 80 reciprocally moves, the second guide pin 62 disposed on the second cam groove 82 moves along the second cam groove 82, and the operating lever 62 and the eject lever 60 that are integrally formed with the operating lever 62 rotate.

Referring to FIG. 3, the first cam groove 81 is formed at a side of the main slider 80 adjacent to the optical pickup assembly 30, and a first guide pin 38 inserted into the first cam groove 81 is formed at a side of the optical pickup assembly 30 that faces the first cam groove 81. Accordingly, in response to the disc 1 being loaded, the first cam groove 81 lifts up the guide pin 38 when chucking of the disc 1 starts, and the optical pickup assembly 30 approaches the disc 1 so as to chuck the disc 1 on the spindle 32.

Figure 5:
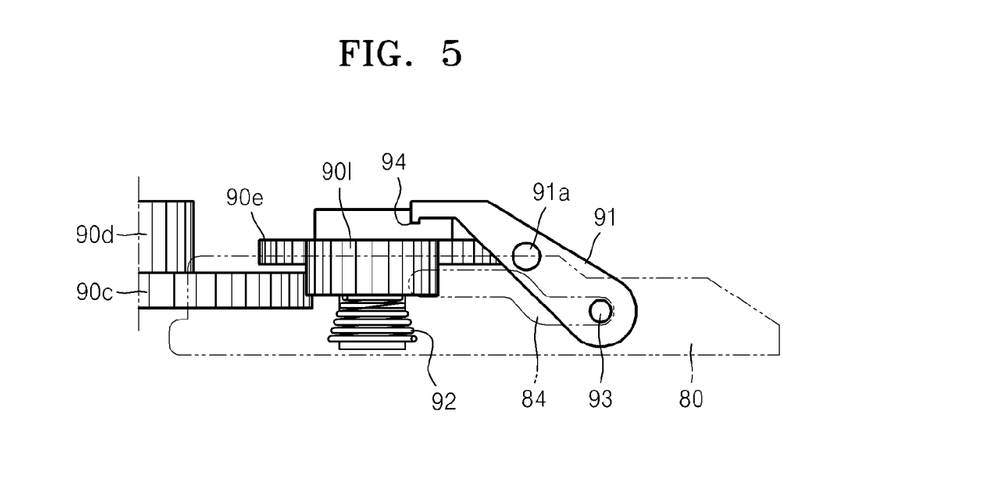
FIGS. 5 through 7 are diagrams illustrating examples of a power switching system process of loading or chucking a disc in the slot-in type optical disc drive of FIGS. 1 and 2.
Figure 6:
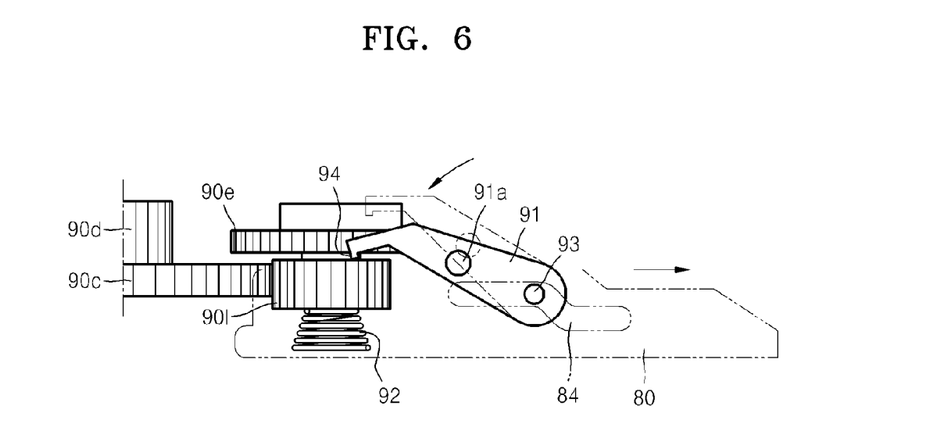
Figure 7:
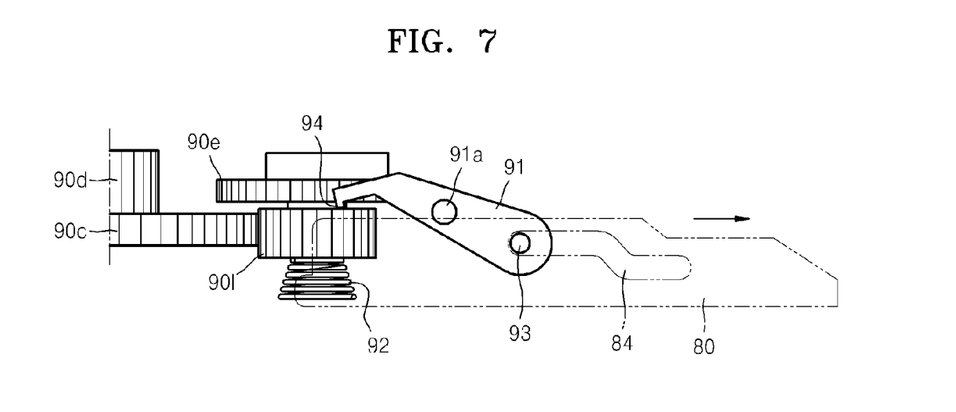

FIGS. 5 through 7 illustrate examples of changes in position of the clutch lever 91 and the clutch gear 90*l* which operate via the main slider 80. In FIGS. 5 through 7, for easy understanding of a power switching system via the clutch gear 90*l*, positions of the fourth gear 90*e* and the clutch gear 90*l* are exchanged.

Referring to FIG. 5, the front end portion of the clutch lever 91, that is, the pressing portion 94 is lifted up. In this example, a normal state is illustrated in which the clutch gear 90*l* that is elastically biased by a spring 92 is commonly engaged with the second gear 90*c* and the fourth gear 90*e*. This state is an initial stage in which loading of the disc 1 has started.

FIG. 6 illustrates the main slider 80 that has entered the main frame 10 so that the disc 1 may be chucked on the spindle 32. In this state, a third guide pin 93 is lifted up by the third cam groove 84 of the main slider 80, and the clutch lever 91 rotates accordingly. The pressing portion 94 of the rotated clutch lever 91 presses the clutch gear 90 so as to deviate from the second gear 90c. In this example, rotation of the fourth gear 90e is stopped, and rotation of the loading roller 50 that transfers power via the fourth gear 90e is stopped. Accordingly, while chucking of the disc 1 is performed, the loading roller 50 does not rotate, and thus the disc 1 and the loading roller 50 do not rub against each other.

According to various aspects, while the loading roller 50 is stopped, the loading motor 70 rotates continuously. Accordingly, the optical pickup assembly 30 which is lifted up or down via the first cam groove portion 81 (see FIG. 1) of the main slider 80 is lifted up so as to start chucking, and the third guide pin 93 is finally in a state of FIG. 7.

FIG. 7 illustrates an example of the movement of the main slider 80 which has stopped as chucking of the disc 1 with respect to the spindle 32 is completed. When the main slider 80 has reached a chucking complete position, driving of the loading motor 70 is stopped by a position detection switch (not shown) which detects a position of the main slider 80.

After loading of the optical disc drive is completed, the optical disc drive having the above-described structure blocks power with respect to the loading roller 50 when chucking begins. Accordingly, damages to the disc 1 due to the loading roller 50 are prevented while chucking of the disc is performed. When loading the disc 1, various methods for blocking a power transmission system from the loading motor 70 may be used.

According to various aspects herein, a disc is transported to a chucking position via a loading roller that is driven by a loading motor. When transportation of the disc is completed, that is, the disc is completely transported to the chucking position, chucking of the disc with respect to a spindle is performed while power with respect to the loading roller is blocked.

Power with respect to the loading roller may be blocked by using a power switching system that is provided in a power train system as described above. For example, the power switching system may include a clutch lever that operates via a main slider and a clutch gear that operates by the clutch lever and that is disposed between second and fourth gears that transfer power in the power train system.

According to the example of the method and device for loading an optical disc described herein, after the disc is transported to a chucking position, loading (or chucking) of the disc on a spindle is performed at a state where power regarding a disc loading roller is blocked. Accordingly, damages to the disc caused by chucking may be prevented.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of driving an optical disc drive including a loading roller, a loading motor providing power to the loading roller, a power train system transferring power between the loading motor and the loading roller, and a main slider, the method comprising:

transporting a disc to a chucking position where a spindle is located, via the loading roller;

blocking power from the loading motor to the loading roller via movement of the main slider, in response to transportation of the disc being completed; and chucking the disc on the spindle using the power transmitted from the loading motor, wherein:

said blocking of the power stops rotation of the loading roller and prevents rubbing between the loading roller and the disc in a state that chucking of the disc on the spindle is performed, and the movement of the main slider causes the spindle to lift up and down, when the main slider is moved from a first position to a second position of travel, a spring applies an elastic-biasing force against a clutch gear so as to move the clutch gear along its rotational axis to an engagement position in which the clutch gear contacts first and second gears of the power train system and, while in the engagement position, transfers a rotational force between the first gear and the second gear, when the main slider is moved from the second position to the first position of travel, the clutch lever contacts the clutch gear and applies a force opposite to that applied by the spring so as to move the clutch gear along its rotational axis to a non-engagement position in which the clutch gear does not contact the first and second gears of the power train system and thereby inhibits the transfer of rotational force between the first gear and the second gear, the first gear receives motive force from the loading motor, and the second gear conveys motive force to the loading roller.

2. The method of claim 1, wherein:
the main slider is operatively connected to the power train system and lifts up and down an optical pickup assembly that includes the spindle, and
the chucking of the disc comprises causing the spindle of the optical pickup assembly to approach the disc via the main slider.

3. The method of claim 1, wherein the main slider of the optical disc drive comprises a first cam groove and a second cam groove such that the chucking of the disc is performed by converting a lateral movement of the main slider into a vertical movement of the spindle to lift the spindle via the first cam groove, and the blocking of the power is performed by converting the lateral movement of the main slider into a movement of the clutch lever to block power transfer by the power train system via the second cam groove.

4. An optical disc loading device comprising:
a loading motor;
a loading roller configured to be driven by the loading motor and to load and unload a disc;
a power train system that is disposed between the loading motor and the loading roller and which comprises a plurality of gears;
a power switching system that is disposed in the power train system and configured to control a power transfer path between the gears, the power switching system comprising:
    a clutch gear that is interposed between the gears of the power train system and which controls the power transfer path between the gears,
    a clutch lever that is synchronized with loading of the disc to operate the clutch gear and which controls the power transfer path, and
    a spring; and
a main slider configured to lift up and down a spindle and to block power from the loading motor to the loading roller in response to the disc being transported to a chucking position, wherein:
the power switching system stops rotation of the loading roller and prevents rubbing between the loading roller and the disc in a state that chucking of the disc on the spindle is performed,
when the main slider is moved from a first position to a second position of travel, the spring applies an elastic-biasing force against the clutch gear so as to move the clutch gear along its rotational axis to an engagement position in which the clutch gear contacts first and second gears of the power train system and, while in the engagement position, transfers a rotational force between the first gear and the second gear,
when the main slider is moved from the second position to the first position of travel, the clutch lever contacts the clutch gear and applies a force opposite to that applied by the spring so as to move the clutch gear along its rotational axis to a non-engagement position in which the clutch gear does not contact the first and second gears of the power train system and thereby inhibits the transfer of rotational force between the first gear and the second gear,
the first gear receives motive force from the loading motor, and
the second gear conveys motive force to the loading roller.

5. The optical disc loading device of claim 4, wherein:
the main slider operates the clutch lever; and
the main slider operates via the loading motor.

6. The optical disc of claim 4, wherein:
the main slider comprises a first cam groove and a second cam groove; and
the main slider is configured to lift up and down the spindle by converting a lateral movement of the main slider into a vertical movement of the spindle via the first cam groove and to block the power by converting the lateral movement of the main slider into a movement of the clutch lever causing the power switching system to stop the rotation of the loading roller via the second cam groove.

7. An optical disc drive comprising:
an optical pickup assembly comprising a spindle on which a disc is mounted, and an optical pickup module;
a loading motor configured to provide power to load the disc;
a loading roller configured to transport the disc in a direction of the spindle;
a power train system that is disposed between the loading motor and the loading roller and which includes a plurality of gears;
a power switching system that is included in the power train system and configured to control a power transfer path between the gears, the power switching system comprising:
    a clutch gear that is interposed between the gears of the power train system and which controls the power transfer path between the gears,
    a clutch lever that is synchronized with loading of the disc to operate the clutch gear and which controls the power transfer path, and
    a spring; and
a main slider configured to lift up and down the spindle and to block power from the loading motor to the loading roller in response to the disc being transported to a chucking position,
wherein:
the power switching system stops rotation of the loading roller and prevents rubbing between the loading roller and the disc in a state that chucking of the disc on the spindle is performed,
when the main slider is moved from a first position to a second position of travel, the spring applies an elastic-biasing force against the clutch gear so as to move the clutch gear along its rotational axis to an engagement first position in which the clutch gear contacts first and second gears of the power train system and, while in the engagement position, transfers a rotational force between the first gear and the second gear,
when the main slider is moved from the second position to the first position of travel, the clutch lever contacts the clutch gear and applies a force opposite to that applied by the spring so as to move the clutch gear along its rotational axis to a non-engagement position in which the clutch gear does not contact the first and second gears of the power train system and thereby inhibits the transfer of rotational force between the first gear and the second gear,
the first gear receives motive force from the loading motor, and
the second gear conveys motive force to the loading roller.

8. The optical disc drive of claim 7, wherein the power train system comprises the main slider that moves reciprocally via one of the gears and operates the clutch lever.

9. The optical disc drive of claim 8, wherein a guide pin is formed in the clutch lever, and a cam groove portion into which the guide pin is inserted is formed in the main slider.

10. The optical disc drive of claim 8, wherein a first cam groove that lifts up or down the optical pickup assembly is formed in the main slider, and a first guide pin that is inserted into the first cam groove is formed on the optical pickup assembly.

11. The optical disc drive of claim 8, further comprising an eject lever that ejects the disc and operates via the main slider.

12. The optical disc drive of claim 11, wherein a guide pin is formed on the eject lever, and a cam groove into which the guide pin is inserted is formed in the main slider.

* * * * *